United States Patent
Wang et al.

(10) Patent No.: US 9,850,357 B2
(45) Date of Patent: Dec. 26, 2017

(54) USE OF POLAR ADDITIVES FOR ENHANCING BLOWING AGENT SOLUBILITY IN POLYSTYRENE

(75) Inventors: Wei Wang, League City, TX (US); Jose M. Sosa, Deer Park, TX (US); David W. Knoeppel, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 13/347,704

(22) Filed: Jan. 11, 2012

(65) Prior Publication Data

US 2012/0208913 A1  Aug. 16, 2012

Related U.S. Application Data

(60) Provisional application No. 61/441,405, filed on Feb. 10, 2011.

(51) Int. Cl.
| | | |
|---|---|---|
| *C08J 9/00* | (2006.01) | |
| *C08J 9/12* | (2006.01) | |
| *C08J 9/14* | (2006.01) | |
| *C08L 25/06* | (2006.01) | |
| *C08L 35/06* | (2006.01) | |

(52) U.S. Cl.
CPC .......... *C08J 9/0014* (2013.01); *C08J 9/12* (2013.01); *C08J 9/142* (2013.01); *C08L 25/06* (2013.01); *C08J 2203/06* (2013.01); *C08J 2203/12* (2013.01); *C08J 2325/04* (2013.01); *C08J 2325/08* (2013.01)

(58) Field of Classification Search
CPC .......................... C08J 9/0014; C08J 2325/08
USPC .......................................... 521/88, 139, 142
See application file for complete search history.

(56) References Cited

U.S. PATENT DOCUMENTS

| | | | |
|---|---|---|---|
| 3,658,946 A | 4/1972 | Bronstert et al. | |
| 3,660,535 A | 5/1972 | Finch et al. | |
| 4,698,367 A | 10/1987 | Ikeda et al. | |
| 4,777,210 A | 10/1988 | Sosa et al. | |
| 4,836,871 A * | 6/1989 | Kato | 156/79 |
| 5,540,813 A | 7/1996 | Sosa et al. | |
| 6,706,827 B1 | 3/2004 | Lyu et al. | |
| 7,060,736 B2 | 6/2006 | Reimers et al. | |
| 7,601,788 B2 | 10/2009 | Reimers et al. | |
| 2006/0058407 A1* | 3/2006 | Ghidoni et al. | 521/142 |
| 2006/0293492 A1* | 12/2006 | Aoshima | C08G 63/82 528/274 |
| 2007/0173554 A1 | 7/2007 | Delaviz et al. | |
| 2007/0299152 A1* | 12/2007 | Patel et al. | 521/79 |
| 2008/0058435 A1* | 3/2008 | Allmendinger et al. | 521/107 |
| 2008/0248227 A1* | 10/2008 | Sumimoto | 428/35.7 |
| 2009/0234035 A1* | 9/2009 | Cheung et al. | 521/81 |
| 2010/0160505 A1* | 6/2010 | Kumazawa et al. | 524/112 |

FOREIGN PATENT DOCUMENTS

| | | | |
|---|---|---|---|
| CN | 101326225 A | | 12/2008 |
| CN | 101558107 A | | 10/2009 |
| JP | 2005247888 A | * | 9/2005 |
| WO | WO-2007015448 A1 | * | 2/2007 |
| WO | 2009148445 A1 | | 12/2009 |
| WO | 2010149624 A1 | | 12/2010 |

OTHER PUBLICATIONS

Machine translation of the Detailed Description of JP-2005247888-A (published Sep. 2005) obtained from the Japan Patent Office.*
Yoshiyuki Sato et al., "Solubilities and diffusion coefficients of carbon dioxide in poly(vinyl acetate) and polystyrene"; Journal of Supercritical Fluids; 2001, 19, 187-198.
Office Action issued in Chinese Application No. 101102266, dated Mar. 14, 2016, 15 pages.

* cited by examiner

*Primary Examiner* — Melissa Rioja
(74) *Attorney, Agent, or Firm* — Albert Shung

(57) ABSTRACT

Foamable polystyrene compositions with enhanced blowing agent solubility and methods of making such polystyrene compositions by incorporating a polar additive in styrenic polymer or copolymers.

8 Claims, 2 Drawing Sheets

Scheme of Dynamic Gravimetric Measurement of $CO_2$ Solubility

USE OF POLAR ADDITIVES FOR ENHANCING BLOWING AGENT SOLUBILITY IN POLYSTYRENE

CROSS-REFERENCE TO RELATED APPLICATIONS

This application is a non-provisional of U.S. Provisional Application Ser. No. 61/441,405 filed Feb. 10, 2011.

FIELD

The present invention is generally related to polymeric compositions. More specifically, the present invention is related to foamable polystyrene compositions.

BACKGROUND

Styrene, also known, as vinyl benzene, is an aromatic compound that is produced in industrial quantities from ethylbenzene. The most common method of styrene production comprises the dehydrogenation of ethylbenzene, which produces a crude product of styrene monomer and unreacted ethylbenzene and hydrogen. Polystyrene is an aromatic polymer produced from the styrene monomer. Polystyrene is a widely used polymer found in insulation, packaging, and disposable cutlery, as well as foamed products including foam cups.

Different types of polystyrene materials can include general-purpose polystyrene (GPPS), high impact polystyrene (HIPS), and transparent impact polystyrene (TIPS). Many conditions affect the properties of the resulting product, including processing time, temperature, pressure, purity of the monomer feedstock, and the presence of additives or other compounds. These and other processing conditions alter the physical and chemical properties of the polystyrene product, affecting the suitability for a desired use.

Foamed polystyrene offers the advantages of low cost and high structural strength for its density. A typical polystyrene foam also has a relatively high impact resistance and possesses excellent electrical and thermal insulation characteristics. Foamed polystyrene is useful in a variety of applications such as insulation, packaging, coolers, food packaging, decorative pieces, and dunnage used to protect and secure cargo during transportation. Additionally, polystyrene foams are commonly classified into three general categories: low density, medium density, and high density. Low density polystyrene foams usually have a density of from about 1 to about 3 lb/ft³ whereas medium density foams may have a density ranging from about 4 to about 19 lb/ft³ and high density foams often have a density ranging from 20 to about 30 lb/ft³.

The two main types of polystyrene foam are extruded polystyrene (XPS) foam and expanded polystyrene (EPS) foam. Extruded polystyrene foam is typically formed by mixing polystyrene with additives and blowing agents into an extruder that heats the mixture. The mixture is then extruded, foamed to the desired shape, and cooled. Expanded polystyrene foam is typically formed by expanding solid polystyrene beads containing a blowing agent such as pentane with steam or hot gas. These pre-expanded beads may later be molded into the desired shape and expanded again with steam or hot gas to fuse the beads together.

In the production of foamed polystyrene, it is common to utilize blowing agents such as methyl chloride, ethyl chloride, chlorocarbons, fluorocarbons (including HFCs) and chlorofluorocarbons (CFCs). However, such blowing agents have been heavily regulated due to potential environmental impact. Many of these traditional and current physical blowing agents are halogenated compounds, which demonstrate a high solubility in polar polymers. An ongoing trend in foaming process development is to find environmentally benign chemicals as blowing agents. Some foaming processes have been using carbon dioxide ($CO_2$) as the blowing agent or co-blowing agent. The advantages of using $CO_2$ include low cost, minimal environmental impact, and eliminating potential fire hazards. It has therefore been desirable to use carbon dioxide as a blowing agent from both environmental and economic standpoints.

However, carbon dioxide has presented problems when used as a blowing agent. Carbon dioxide has been found to have a relatively low solubility in styrenic polymer melts. For example, the solubility of $CO_2$ in polystyrene is only ca. 4 wt % at 6.5 MPa and 373 K, as measured by Yoshiyuki Sato et. al. (*Journal of Supercritical Fluids* 2001, 19, 187-198.). The low solubility results in high extrusion pressures, which increases costs and reduces quality. The low solubility also results in a higher density product. It would be desirable to obtain a polystyrene product having a high carbon dioxide solubility in order to reduce costs and increase product quality.

SUMMARY

An embodiment of the present invention is a foamable composition that includes a styrenic polymer, a polar additive, and optionally a blowing agent. The styrenic polymer can come from the polymerization of a reaction mixture having a first monomer selected from the group consisting of styrene, alpha-methyl styrene, vinyl toluene, p-methyl styrene, t-butyl styrene, o-chlorostyrene, vinyl pyridine, and any combinations thereof. The styrenic polymer can be present in the blend in amounts ranging from 80 to 99 wt % based on the total weight of the styrenic polymer and polar additives.

In a non-limiting embodiment, either by itself or in combination with any other aspect of the invention, the polar additive can be selected from the group consisting of polar plasticizers or polar oligomers, and combinations thereof. The polar additive can be selected from the group consisting of styrene-maleic anhydride co-polymers, polyesters oligomers such as poly(1,4-butylene adipate), polyethers such as polyethylene glycol, and combinations thereof. The polar additive can be present in amounts ranging from 0.5 to 10 wt % based on the total weight of the styrenic polymer and polar additives.

In a non-limiting embodiment, either by itself or in combination with any other aspects of the invention, the blowing agent can be selected from the group of carbon dioxide ($CO_2$), water ($H_2O$), ethanol, air, nitrogen, argon, and helium and combinations thereof, and can be used in foaming of polystyrene in a weight proportion ranging from 1 to 30 parts per 100 parts of the styrenic material.

In a non-limiting embodiment, either by itself or in combination with any other aspect of the invention, the reaction mixture can also include a second monomer in amounts ranging from 0.5 to 10 wt % based on the total weight of the styrenic copolymer. The second monomer can be hydroxyethylmethacrylate (HEMA).

An embodiment of the present invention can also be an article derived from the foamed polystyrene of any embodiment disclosed herein.

An alternate embodiment, either by itself or in combination with any other aspect of the invention, is a method of making foamed polystyrene that includes subjecting a reaction mixture comprising styrene monomer and a polar additive to polymerization to obtain a polystyrene, and further subjecting the polystyrene to a blowing agent under certain process conditions to obtain an foamed polystyrene. The polar additive may be is combined with the polystyrene by post-reactor blending. The polar additive can be selected from the group consisting of styrene-maleic anhydride co-polymers, polyesters oligomers such as poly(1,4-butylene adipate), polyethers such as polyethylene glycol, and combinations thereof. The method can also include subjecting the foamable polystyrene melt to a reduced pressure to obtain a foamed polystyrene. Other possible embodiments include two or more of the above aspects of the invention. In an embodiment the method includes all of the above aspects and the various procedures can be carried out in any order.

DETAILED DESCRIPTION

Figure 1:
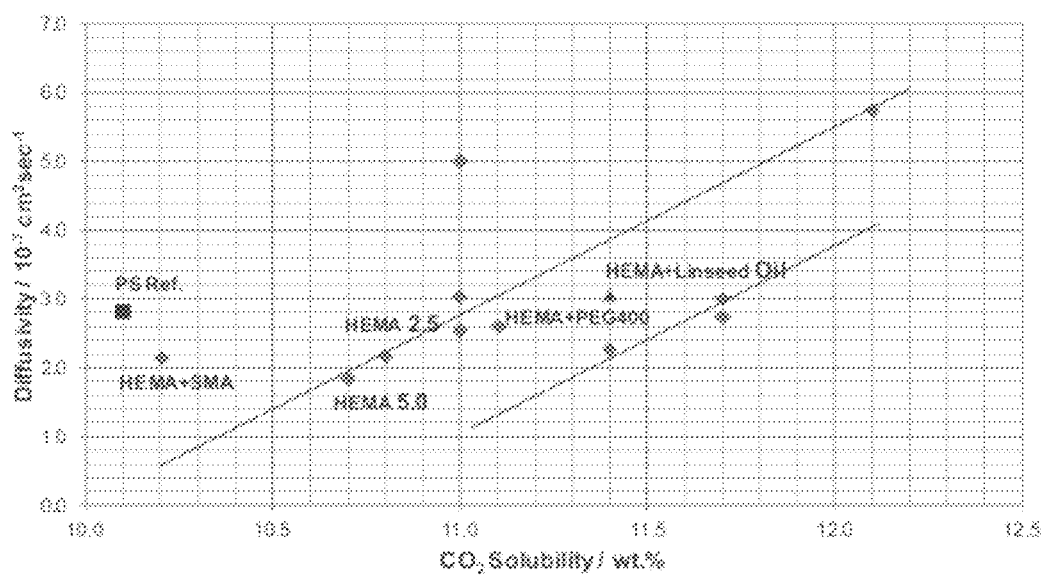
FIG. 1 is a plot of $CO_2$ diffusivity versus solubility of polystyrene modified by various polar additives.

The present invention includes blends of styrenic polymers and polar additives. In an embodiment, the present invention includes a blend of homopolymers and/or copolymers of polystyrene and polar additives. In a more specific embodiment, the present invention includes a foamed polymeric component containing a base polystyrene material and at least one polar additive.

In an embodiment, the blend of the present invention includes a styrenic polymer. In another embodiment, the styrenic polymer includes polymers of monovinylaromatic compounds, such as styrene, alpha-methyl styrene and ring-substituted styrenes. In an alternative embodiment, the styrenic polymer includes a homopolymer and/or copolymer of polystyrene. In a further embodiment, the styrenic polymer is polystyrene. In an even further embodiment, styrenic monomers for use in the styrenic polymer composition can be selected from the group of styrene, alpha-methyl styrene, vinyl toluene, p-methyl styrene, t-butyl styrene, o-chlorostyrene, vinyl pyridine, and any combinations thereof. The styrenic polymeric component in the blend of the present invention can be produced by any known process. In an aspect, the styrenic polymer is polystyrene.

The blend of the present invention may contain any desired amounts of a styrenic polymer. In an embodiment, the blend contains at least 50 wt % of a styrenic polymer. In another embodiment, the blend contains a styrenic polymer in amounts ranging from 1 to 99 wt %, 50 to 95 wt %, 60 to 92 wt %, and optionally 70 to 90 wt %. In a further embodiment, the blend contains a styrene polymer in amounts ranging from 80 to 99 wt %. In an even further embodiment, the blend contains a styrenic polymer in amounts ranging from 90 to 99 wt %.

The styrenic polymer of the present invention may include general-purpose polystyrene (GPPS), high-impact polystyrene (HIPS), styrenic copolymer compositions, or any combinations thereof. In an embodiment, the HIPS contains an elastomeric material. In an embodiment, the HIPS contains an elastomeric phase embedded in the polystyrene matrix, which results in the polystyrene having an increased impact resistance.

The styrenic polymer of the present invention may be a styrenic copolymer. The styrenic polymer of the present invention may be formed by co-polymerizing a first monomer with a second monomer, and optionally other monomers. The first monomer and the second monomer may be co-polymerized by having the first monomer and the second monomer present in a reaction mixture that is subjected to polymerization conditions. The first monomer may include monovinylaromatic compounds, such as styrene, alpha-methyl styrene and ring-substituted styrenes. In an embodiment, the first monomer is selected from the group of styrene, alpha-methyl styrene, vinyl toluene, p-methyl styrene, t-butyl styrene, o-chlorostyrene, vinyl pyridine, and any combinations thereof. In another embodiment, styrene is used exclusively as the first monomer. The second monomer can be any suitable monomer capable of polymerization to form a styrenic copolymer. Examples of suitable second monomers can include. hydroxyethylmethacrylate, caprolactone acrylate, alkyl (meth)acrylate, fluorinated (meth) acrylate and any other polymerizable monomers containing polar functionalities such as esters, ethers, carboxylic acids, silanes, and combinations thereof.

The first monomer may be present in the styrenic polymer in any desired amounts. In an embodiment, the first monomer is present in the reaction mixture in amounts of at least 50 wt % of the reaction mixture. In another embodiment, the first monomer is present in the reaction mixture in amounts ranging from 90 to 99.9 wt % of the reaction mixture. In a further embodiment, the first monomer is present in the reaction mixture in amounts ranging from 95 to 99 wt %.

In a non-limiting embodiment, either by itself or in combination with any other aspect of the invention, the polar additives of the present invention may contain polar plasticizers or polar oligomers. In an embodiment, the polar additives are selected from the group of epoxidized linseed oil, styrene-maleic anhydride co-polymers, polyesters oligomers such as poly(1,4-butylene adipate), polyethers such as polyethylene glycol, and combinations thereof. In an embodiment, the styrene-maleic anhydride (SMA) co-polymers include SMA® EF40 (EF40) and SMA® EF80 (EF80), which are commercially available from Sartomer Company, Inc. EF40 includes styrene-to-maleic anhydride ratios of 4:1, while EF 80 includes styrene-to-maleic anhydride ratios of 8:1. In an embodiment, the polar additives may be present in the blend in amounts of at least 0.1 wt % based on the total weight of the blend. In another embodiment, the polar plasticizer(s) may be present in the blend in amounts ranging from 0.5 to 10 wt %. In a further embodiment, the polar plasticizer(s) may be present in the blend in amounts ranging from 1 to 5 wt %. In an even further embodiment, the polar plasticizer(s) may be present in the blend in amounts ranging from 1.5 to 2.5 wt %.

The polymerization of the styrenic monomer, polar additive, and any co-monomer may be carried out using any method known to one having ordinary skill in the art of performing such polymerizations. In an embodiment, the polymerization may be carried out by using a polymerization initiator.

In a non-limiting embodiment, either by itself or in combination with any other aspect of the invention, the polymerization initiators include radical polymerization initiators. The radical polymerization initiators may include but are not limited to perketals, hydroperoxides, peroxycarbonates, and the like. These radical polymerization initiators may be selected from the group of benzoyl peroxide, lauroyl peroxide, t-butyl peroxybenzoate, and 1,1-di-t-butylperoxy-2,4-di-t-butylcycleohexane, and combinations thereof. In an embodiment, the amount of the polymerization initiator is from 0 to 1.0 percent by weight of the reaction mixture. In another embodiment, the amount of the polymerization initiator is from 0.01 to 0.5 percent by weight of the reaction mixture. In a further embodiment, the amount of the polymerization initiator is from 0.025 to 0.05 percent by weight of the reaction mixture.

Any process capable of processing or polymerizing styrenic monomers may be used to prepare the styrenic co-polymer of the present invention. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomers and a catalyst or polymerization initiator. Solution polymerization refers to a polymerization process in wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. The styrenic polymer composition can be prepared using an upflow reactor, a downflow reactor, or any combinations thereof. The reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, either by itself or in combination with any other aspect of the invention, the polymerization reaction is one in which heat is used as the initiator. In a further embodiment, the polymerization is performed using a non-conventional initiator such as a metallocene catalyst as is disclosed in U.S. Pat. No. 6,706,827 to Lyu, et al., which is incorporated by reference herein in its entirety. In one embodiment, the monomer(s) may be admixed with a solvent and then polymerized. In another embodiment, one of the monomers is dissolved in the other and then polymerized. In still another embodiment, the monomers may be fed concurrently and separately to a reactor, either neat or dissolved in a solvent, such as mineral oil. In yet another embodiment, a second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation known to be useful to those of ordinary skill in the art in preparing such polymers may be used. For example, the process disclosed in U.S. Pat. No. 5,540,813 to Sosa, et al., may be used and is incorporated herein by reference in its entirety. The processes disclosed in U.S. Pat. No. 3,660,535 to Finch, et al., and U.S. Pat. No. 3,658,946 to Bronstert, et al., may be used and are both incorporated herein by reference in their entirety. Any process for preparing general-purpose polystyrene may be used to prepare the styrenic co-polymer of the present invention.

In certain embodiments, the styrenic polymer may be admixed with additives prior to being used in end use applications. For example, the styrenic polymer may be admixed with fire retardants, antioxidants, lubricants, blowing agents, UV stabilizers, antistatic agents, and the like. Any additive known to those of ordinary skill in the art to be useful in the preparation of styrenic polymers may be used. $CO_2$ solubility may increase for lower molecular weight polystyrene copolymer, therefore, it may be desirable to maintain or control the molecular weight of the styrenic copolymer. In an embodiment, chain transfer agents and/or diluents may be added before and/or during polymerization in order to help control the molecular weight of the resulting styrenic polymer.

The obtained polystyrene copolymer may then be sent to an extruder or other steps to obtain an end use article. The blowing agents such as HFC or $CO_2$ are added into the polymer melt during the extrusion process. Alternatively, the obtained styrenic polymer or copolymer may be mixed with a blowing agent to obtain a polymeric resin containing a blowing agent. The polymeric resin containing a blowing agent may then be sent other steps to obtain an end use article.

In an embodiment, styrene monomer is combined with a second monomer and polar additives and subsequently polymerized to form a polystyrene composition. Alternatively, styrene monomer is combined with a second monomer and subsequently polymerized to form a polystyrene copolymer. The polystyrene copolymer may then be combined with a polar additive to form a polystyrene composition. The final polystyrene composition may then be sent to an extruder or other steps to obtain an end use article. The blowing agents can be added to the polystyrene containing composition during the extruding step.

In an embodiment the second monomer may contain a polar functional group. In an embodiment, the second monomer is a polar vinyl functional monomer. In another embodiment, the second monomer is selected from the group of hydroxyethylmethacrylate (HEMA), vinyl acetate, glycidyl methacrylate (GMA), caprolactone acrylate, alkyl (meth) acrylate, fluorinated (meth)acrylate, 3-(trimethoxysilyl)propyl methacrylate, maleic anhydride and any other polymerizable monomers containing polar functionalities such as esters, ethers, carboxylic acids or silanes, and combinations thereof. In a further embodiment, the second monomer is selected from the group of GMA, vinyl acetate, caprolactone acrylate, and HEMA, and combinations thereof. In an embodiment, the second monomer is HEMA.

The styrenic co-polymer may contain any desired amounts of a second monomer. In an embodiment, the second monomer is present in the reaction mixture of in amounts of at least 0.1 wt %. In an alternative embodiment, the second monomer is present in the reaction mixture is amounts ranging from 0.5 to 40 wt %. In another embodiment, the second monomer is present in the reaction mixture in amounts ranging from 0.5 to 20 wt %. In a further embodiment, the second monomer is present in the reaction mixture in amounts ranging from 0.5 to 10 wt %. In an even further embodiment, the second monomer is present in the reaction mixture in amounts ranging from 0.5 to 5 wt %.

An end use article may include a blend of the present invention. In an embodiment, the articles include films, sheets and thermoformed or foamed articles. For example, a final article may be thermoformed from a sheet containing the blend. In another embodiment, the end use articles include foamed articles, which may have a foamed structure.

The present invention may include foamed articles which may be formed by melting and mixing the styrenic copolymer blend of the invention to form a polymer melt, incorporating a blowing agent into the polymer melt to form a foamable blend, and extruding the foamable blend through a die to form the foamed structure. During melting and mixing, the polymeric material may be heated to a temperature at or above the glass transition temperature of the polymeric material. The melting and mixing of polymeric material and any additives may be accomplished by any means known in the art, including extruding, mixing, and/or blending. In an embodiment, a blowing agent is blended with molten polymeric material. The blending of the blowing agent with the molten polymeric material may be performed under atmospheric or elevated pressures.

In a non-limiting embodiment, either by itself or in combination with any other aspect of the invention, the blowing agent is incorporated into the styrenic copolymer during melt extrusion in a weight proportion ranging from 1 to 30 parts per 100 parts of the polymeric material to be foamed. In another embodiment, the blowing agent is incorporated into the styrenic copolymer during melt extrusion in a weight proportion ranging from 2 to 20 parts per 100 parts per polymeric material to be foamed. In a further embodiment, the blowing agent is incorporated into the styrenic copolymer during melt extrusion in a weight proportion ranging from 4 to 12 parts per 100 parts per polymeric material to be foamed.

The blowing agents of the present invention may include organic and/or inorganic compounds. In an embodiment, the blowing agents of the present invention are more environmentally benign than methyl chloride, ethyl chloride, chlorocarbons, fluorocarbons (including HFCs) and chlorofluorocarbons (CFCs). In a further embodiment, the blowing agents of the present invention are selected from the group of carbon dioxide ($CO_2$), water ($H_2O$), ethanol, air, nitrogen, argon, butane, pentane, and helium and combinations thereof. In an even further embodiment, the blowing agent of the present invention is entirely composed of $CO_2$.

The foamable polystyrene melt composition may be cooled after the blowing agent is incorporated. In an embodiment, the foamable polystyrene melt composition is cooled to temperatures ranging from 30 to 150° C., optionally 75 to 150° C. The cooled, foamable polystyrene melt composition may then be passed through a die into a zone of lower pressure to form, an article, or other foamed structure. The use of the polystyrene copolymer can also be used for not only foams, but also for rigid blends.

The obtained polystyrene foams may have any desired density. In an embodiment, the density of the obtained polystyrene foams ranges from 15 to 0.1 lbs/ft³. In another embodiment, the density of the obtained polystyrene foams ranges from 10 to 0.5 lbs/ft³. In a further embodiment, the density of the obtained polystyrene foams ranges from 3 to 0.6 lbs/ft³.

An end use article may include a composition of the present invention. In an embodiment, the articles include films and thermoformed or foamed articles. For example, a final article may be thermoformed from a sheet containing the blend. In another embodiment, the end use articles include foamed articles, which may have a foamed structure. In an embodiment, an article can be obtained by subjecting the polymeric composition to a plastics shaping process such as extrusion. The polymeric composition may be formed into end use articles including food packaging, food/beverage containers, polymeric foam substrate, foamed insulation, building insulation, protective head gear, toys, dunnage, and the like.

In an embodiment, the obtained polystyrene foam is a multicellular article having a plurality of cells that may be open or closed. In another embodiment, the majority of the cells are open. In an alternative embodiment, the majority of the cells are closed.

EXAMPLES

Example 1

Polystyrene samples were prepared in batch reactions by copolymerizing styrene with 2-hydroxyethyl methacrylate (HEMA, 2.5 wt. %) and the presence of polar additive (2.3 wt. %) in the feed. The polymerization reaction was carried out in a batch reactor. Lupersol-233 was added as the initiator with an initial concentration of ca. 170 ppm in the reaction mixture. The reaction was then run isothermally at 130° C. with continuous agitation at 150 rpm for ca. 3 hours or until 75% conversion was reached. The reaction mixture was then transferred onto an aluminum pan and devolatized under active vacuum (<10 torr) at 225° C. for 45 mm.

Each polymerization product was characterized in terms of molecular weight, melt index and thermal behavior, as listed in Table 2. The type of polar additive, varied in each sample. In the sample #1, no polar additive was used. Five different polar additives were used in the remaining five samples (#2-6). The five polar additives were styrene maleic anhydride copolymer (SMA), including styrene-to-maleic anhydride ratios of 4:1 (SMA EF40) and 8:1 (SMA EF80), poly(1,4-butlyene adipate) (Adipate), epoxidized linseed oil (Vikoflex® 7190, commercially produced by Arkema, Inc.) (V7190), and polyethylene glycol (PEG400 and PEG1000).

TABLE 1

Feed Formulations of Modified PS (unit: gram)

| No. | % | 1 | 2 | 3 | 4 | 5 | 6 |
|---|---|---|---|---|---|---|---|
| Styrene | n/a | 195.0 | 190.4 | 190.4 | 190.4 | 190.4 | 190.4 |
| HEMA | 2.5 | 5.0 | 5.0 | 5.0 | 5.0 | 5.0 | 5.0 |
| SMA EF-40 | 2.3 | 0 | 4.6 | 0 | 0 | 0 | 0 |
| SMA EF-80 | 2.3 | 0 | 0 | 4.6 | 0 | 0 | 0 |
| Adipate | 2.3 | 0 | 0 | 0 | 4.6 | 0 | 0 |
| Vikoflex 7190 | 2.3 | 0 | 0 | 0 | 0 | 4.6 | 0 |
| PEG400 | 2.3 | 0 | 0 | 0 | 0 | 0 | 4.6 |
| TOTAL | | 200 | 200 | 200 | 200 | 200 | 200 |

The resulting polymerized samples were analyzed using gel permeation chromatography (GPC) coupled with ultraviolet (UV) spectroscopy, known as GPC-UV. The polystyrene samples containing SMA EF40/80 appeared to have the lowest number-average molecular weight (Mn), highest z-average molecular weight (Mz) and highest weight average molecular weight (Mw), and therefore the widest polydispersity (PDI) values, wherein PDI=Mw/Mn. It should be noted first that, given the fact that UV detection being used in gel permeation chromatography (GPC), the molecular weight measurements were biased lower when SMA EF40/80 is present in polystyrene since SMA is a low molecular weight styrene copolymer. The GPC-UV results from other plasticizers, however, were not affected due to their relative weak absorbance at 254 nm. Mz values of EF40/80 samples were higher than that obtained from the other polar additives. The same trend of Mz was, however, not observed in samples containing epoxy, polyester and polyether polar additives.

The resulting values of melt index and glass transition temperature show that the samples having polar additive of Adipate, Vikoflex® 7190, PEG400, and PEG1000 were well plasticized, as evident from the increase of melt flow and significant decrease of Tg.

interaction of SMA with HEMA resulting in strong interchain interaction. From the entropy point of view, the free volume of polymer matrix suffers when crosslinking retards the mobility of polymeric chains. The point seems to be proved by the limited swelling of the sample (6.9%). The free volume has profound effects on the gas solubility and diffusivity in polymers. As measured, the SMA modified PS shows lower $CO_2$ solubility (10.2%) and decreased diffusivity ($2.2 \times 10^{-7}$ $cm^2 sec^{-1}$).

Contrary to SMA, the oligomeric polyester seems to induce a dramatic $CO_2$ solubility gain in PS. The PS sample plasticized by polyester oligomers (poly(1,4-butylene adipate), Mn~1000, 2.3 wt. % in PS) shows a $CO_2$ solubility at 13.1 wt. %, almost 30% above the un-modified PS and 20% higher than the HMEA-modified PS reference. This is, by far, the highest $CO_2$ solubility observed among all modified PS. This result may not be totally surprising given the fact

TABLE 2

Molecular Weights, Melt Index and Glass Transition Temperature of Plasticized Polystyrene.

| Modifier Type | Mn | Mw | Mz | Mp | Mw/Mn | MFI/g · 10 min$^{-1}$ | Tg/° C. | Mn of Additive |
|---|---|---|---|---|---|---|---|---|
| HEMA 2.5% | 142,000 | 336,000 | 523,000 | 315,000 | 2.4 | 1.9 | 103.2 | n/a |
| HEMA 2.5% + SMA EF40 | 104,000 | 338,000 | 675,000 | 253,000 | 3.3 | 1.1 | 103.7 | 4,500 |
| HEMA 2.5% + SMA EF80 | 97,000 | 299,000 | 534,000 | 260,000 | 3.1 | 2.1 | 103.2 | 7,500 |
| HEMA 2.5% + Adipate | 132,000 | 282,000 | 438,000 | 267,000 | 2.1 | 3.8 | 95.9 | 1,000 |
| HEMA 2.5% + Vikoflex V7190 | 122,000 | 264,000 | 414,000 | 247,000 | 2.2 | 4.0 | 89.7 | 878 |
| HEMA 2.5% + PEG400 | 120,000 | 261,000 | 405,000 | 247,000 | 2.2 | 4.7 | 87.6 | 400 |
| HEMA 2.5% + PEG1000 | 115,000 | 265,000 | 424,000 | 286,000 | 2.3 | 3.9 | 87.4 | 1,000 |

Example 2

In a related example, samples of the six polystyrene blends from Example 1 were each subjected to dynamic $CO_2$ solubility measurements. The $CO_2$ solubility and diffusivity data are given in Table 3 which lists the name of samples by modifier, the glass transition temperature ($T_g$), the measured $CO_2$ solubility ($M_{gas,0}$), the desorption rate of $CO_2$ (D) at room temperature and the relative change of sample dimension (as a rough measure of swelling). A plot of $CO_2$ diffusivity versus solubility of various samples was also constructed as shown in FIG. 1. From the data available, it is clear that, depending on the structural type, the additive may enhance, lower or has no effect on $CO_2$ solubility. The reference material adopted here is the PS sample modified with HEMA (2.5 wt. %) which has a $CO_2$ solubility of 11.0 wt. % and desorption diffusivity of $2.6 \times 10^{-7}$ $cm^2 sec^{-1}$. Compared to this reference, the PS modified with styrene-maleic anhydride (SMA) shows a negative effect on $CO_2$ solubility. The addition of SMA into HEMA-modified PS dramatically increased $M_z$ that drove down the melt flow index. This change is believed to be due to the polar that $CO_2$ normally shows very high solubility in solvents containing carbon-oxygen bonds (e.g., esters, ethers, some ketones). The favorable enthalpy-type of polar interaction appears to be the dominating effect as the swelling of the sample is moderate (8.1%). The $CO_2$ diffusivity in polyester-modified PS appears to be very high, about one order of magnitude higher than other PS samples (off chart in FIG. 1). Increase of $CO_2$ diffusivity along with solubility has been expected. Despite high solubility and diffusivity of $CO_2$, the sample did not appear to show significant swelling (~8%).

PEG and linseed oil have only marginal, if any, effect on $CO_2$ solubility when compared HEMA-modified PS. However, more swelling (as a consequence of plasticization) was indeed observed in those samples. A thickness change of as high as 17% was observed in the glyceride oil plasticized PS.

TABLE 3

$CO_2$ Solubility and Diffusivity in Additive-Modified PS (Saturation Conditions: 1500 psi, 50° C.)

| Sample | $T_g$/° C. | $M_{gas,0}$/wt. % | D/10$^{-7}$ cm$^2$sec$^{-1}$ | Δ(thickness) |
|---|---|---|---|---|
| PS Ref. | 104.4 | 10.1 | 2.8 | 4.9% |
| HEMA 5% | 103.1 | 10.7 | 1.9 | 3.1% |
| HEMA 2.5% | 103.2 | 11.0 | 2.6 | 7.2% |
| HEMA 2.5% + SMA EF40 2.3% | 103.7 | 10.2 | 2.2 | 6.9% |
| HEMA 2.5% + Adipate 2.3% | 95.9 | 13.1 | 28.1 | 8.1% |
| HEMA 2.5% + Vikoflex 7190 2.3% | 89.7 | 11.4 | 3.1 | 17.4% |
| HEMA 2.5% + PEG400 2.3% | 87.6 | 11.1 | 2.6 | 8.9% |

Measurement of $CO_2$ Solubility

Figure 2:
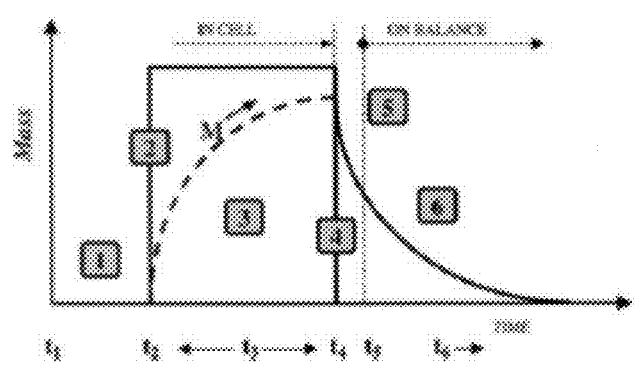
FIG. 2 is a diagram illustrating the experimental scheme of dynamic gravimetric measurement of $CO_2$ solubility.

The polymer samples were molded into disks with a thickness of 1.4 mm and a diameter of 25 mm. The relatively large surface area on both sides of the disks ensures that the diffusion of gas occurs mainly in the normal direction of the disk planes. The sample disk was weighed ($M_{ini}$) and then transferred into the Parr pressure vessel, which was purged with $CO_2$ at least 3 times, subsequently heated to 50° C. and pressurized with carbon dioxide to 1,500 psi to reach a supercritical state. Both temperature and pressure were maintained for a period of time ($t_3$ in FIG. 2) to allow $CO_2$ absorption into the sample disk. The pressure is then released instantaneously to atmosphere (at $t_4$). The sample disk is quickly taken from the pressure vessel and placed onto a moisture balance (Ohaus) to record the weight loss as a function of time at room temperature. Reduction of sample weight was observed due to desorption of $CO_2$. The dynamic evolution of weight ($M_t$) was recorded by a computer through an RS232 cable and WinWedge program. The dynamic weight change of the sample disk recorded (after $t_5$) was used to calculate the $CO_2$ solubility as well as diffusivity with the aid of Fick's diffusion law and appropriate boundary conditions. The weight data recorded (after $t_5$) can be extrapolated to the initial weight (at $t_4$), prior to the depressurization, to obtain the $CO_2$ absorption concentration as well as the desorption rate of $CO_2$. The general scheme of measurement can be summarized in FIG. 2.

The amount of $CO_2$ remaining in the sample disk at any given moment can be represented by $M_{gas,t}$ and calculated according to equation: $M_{gas,t}=(M_t-M_{ini})/M_{ini}\times 100\%$. The amount of $CO_2$ dissolved in a sample under equilibrium conditions is $M_{gas,0}$ at $t=0$, i.e., right before the depressurization. $M_{gas,t}$ should drop as a function of time (t) and eventually approach zero when $t=\infty$.

To find the amount of $CO_2$ dissolved in the sample prior to the depressurization, one needs to extrapolate the data to $t=0$. Assuming a constant diffusion coefficient of $CO_2$, it can be shown from literature that $M_{gas,t}$ is a linear function of the square root of time:

$$M_{gas,t} = M_{gas,0} - \frac{4}{l} \cdot \sqrt{\frac{D \cdot t}{\pi}} \cdot M_{gas,0} \quad \text{(Equation 1)}$$

where l is the thickness of the sample disk and D is the diffusion coefficient of $CO_2$. Use of this equation implicitly assumes uniformity of the initial gas concentration and homogeneity and isotropy of the sample structure. It also implies that the diffusion coefficient is constant regardless of the desorption time, gas concentration in the sample during desorption and temperature variation which could exist during the depressurization process. By making a linear plot of $M_{gas,t}$ vs. $t_{1/2}$, one can calculate $M_{gas,0}$ and D from the intercept (at $t=0$) and slope, which corresponds to $CO_2$ solubility and diffusivity in the sample polymer, respectively.

As used herein, the term "monomer" refers to a relatively simple compound, usually containing carbon and of low molecular weight, which can react by combining one or more similar compounds with itself to produce a polymer.

As used herein, the term "co-monomer" refers to a monomer which is copolymerized with at least one different monomer in a copolymerization reaction resulting in a copolymer.

As used herein, the term "polymer" refers to a polymer resulting from polymerization of a single monomer species.

As used herein, the term "co-polymer," also known as a "heteropolymer," is a polymer resulting from polymerization of two or more monomer species.

As used herein, the term "copolymerization" refers to the simultaneous polymerization of two or more monomer species.

As used herein, the term "polymer" generally includes, but is not limited to homopolymers, co-polymers, such as, for example, block, graft, random and alternating copolymers, and combinations and modifications thereof.

The various embodiments of the present invention can be joined in combination with other embodiments of the invention and the listed embodiments herein are not meant to limit the invention. All combinations of various embodiments of the invention are enabled, even if not given in a particular example herein.

It is to be understood that while illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A foamable polymeric composition comprising:
   a blend comprising a styrenic polymer and from 1.5 to 2.5 weight percent of a polar additive based on the total weight of the styrenic polymer and polar additive;
   wherein the styrenic polymer is a copolymer of a styrenic monomer and hydroxyethyl methacrylate;
   wherein the polar additive is epoxidized linseed oil; and
   a blowing agent comprising $CO_2$ incorporated into the blend, wherein the blend exhibits increased solubility of $CO_2$ in comparison to the solubility of $CO_2$ exhibited by the styrenic polymer without the polar additive.

2. The foamable polymeric composition of claim 1, wherein the styrenic monomer is selected from the group consisting of styrene, alpha-methyl styrene, vinyl toluene, p-methyl styrene, t-butyl styrene, o-chlorostyrene, vinyl pyridine, and any combinations thereof.

3. The foamable polymeric composition of claim 1, wherein the blowing agent is entirely composed of $CO_2$.

4. The foamable polymeric composition of claim 1, wherein the blowing agent further comprises water ($H_2O$), ethanol, air, nitrogen, argon, helium, or combinations thereof.

5. The foamable polymeric composition of claim 1, wherein the blowing agent is incorporated in a weight proportion ranging from 2 to 20 parts per 100 parts of the styrenic polymer.

6. Foamed polystyrene made from the foamable polymeric composition of claim 1.

7. An article made from the foamed polystyrene of claim 6.

8. The article of claim 7, wherein the article is a multicellular article comprising a plurality of cells, and wherein a majority of the plurality of cells are open.

* * * * *